United States Patent
Iwase (10) Patent No.: US 9,911,028 B2
(45) Date of Patent: Mar. 6, 2018

(54) IMAGE ACQUISITION DEVICE AND IMAGE ACQUISITION METHOD FOR IMAGE ACQUISITION DEVICE

(71) Applicant: HAMAMATSU PHOTONICS K.K., Hamamatsu-shi, Shizuoka (JP)

(72) Inventor: Fumio Iwase, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/031,083

(22) PCT Filed: Jan. 28, 2014

(86) PCT No.: PCT/JP2014/051804
§ 371 (c)(1),
(2) Date: Apr. 21, 2016

(87) PCT Pub. No.: WO2015/064116
PCT Pub. Date: May 7, 2015

(65) Prior Publication Data
US 2016/0267317 A1    Sep. 15, 2016

(30) Foreign Application Priority Data
Nov. 1, 2013 (JP) .................................. 2013-228560

(51) Int. Cl.
*G06K 9/00* (2006.01)
*G02B 21/36* (2006.01)
(Continued)

(52) U.S. Cl.
CPC ......... *G06K 9/00134* (2013.01); *G02B 21/06* (2013.01); *G02B 21/26* (2013.01);
(Continued)

(58) Field of Classification Search
CPC . G09B 9/00; H04N 7/18; G01B 11/24; G02B 21/00; G02B 21/36; G06T 7/00; G06T 5/50
See application file for complete search history.

(56) References Cited

U.S. PATENT DOCUMENTS

2010/0067780 A1* 3/2010 Kawaragi ............. B81C 99/005
                                                                    382/149
2016/0004062 A1* 1/2016 Dixon .................... G02B 21/36
                                                                    348/80

FOREIGN PATENT DOCUMENTS

CN      101995652      3/2011
CN      102854615      1/2013
(Continued)

OTHER PUBLICATIONS

International Preliminary Report on Patentability dated May 3, 2016 for PCT/JP2014/051804.

*Primary Examiner* — Behrooz Senfi
*Assistant Examiner* — Maryam Nasri
(74) *Attorney, Agent, or Firm* — Drinker Biddle & Reath LLP (57) ABSTRACT

In this image acquisition device, a stage driving unit moves a position of a field of view of an objective lens relative to a sample at a predetermined velocity, and a two-dimensional imaging element sequentially captures an optical image of the sample at a predetermined frame rate. Therefore, time required for acquiring partial images over the entire sample is shortened. Further, in this image acquisition device, the moving velocity of the position of the field of view is a velocity set based on a frame rate of the imaging element. Therefore, the movement of the position of the field of view and the imaging of the imaging element are synchronized with each other, and it is possible to capture only necessary partial images.

5 Claims, 5 Drawing Sheets

(51) Int. Cl.
*G02B 21/06* (2006.01)
*G02B 21/26* (2006.01)
G02B 21/08 (2006.01)
H04N 5/232 (2006.01)

(52) U.S. Cl.
CPC ......... *G02B 21/365* (2013.01); *G02B 21/367* (2013.01); *G02B 21/086* (2013.01); *H04N 5/23238* (2013.01)

(56) References Cited

FOREIGN PATENT DOCUMENTS

| | | |
|---|---|---|
| EP | 1324097 | 7/2003 |
| EP | 1439385 | 7/2004 |
| JP | H09-281405 A | 10/1997 |
| JP | S63-191063 A | 8/1998 |
| JP | H11-326233 A | 11/1999 |
| JP | 2000-501844 A | 2/2000 |
| JP | 2003-222801 A | 8/2003 |
| JP | 2009-128648 A | 6/2009 |
| JP | 2010-002534 A | 1/2010 |
| JP | 2010-271550 A | 12/2010 |
| JP | 2014-026233 A | 2/2014 |
| WO | WO 97/004347 | 2/1997 |

\* cited by examiner

IMAGE ACQUISITION DEVICE AND IMAGE ACQUISITION METHOD FOR IMAGE ACQUISITION DEVICE

TECHNICAL FIELD

The present invention relates to an image acquisition device and an image acquisition method for an image acquisition device.

BACKGROUND ART

In an image acquisition device for acquiring a still image of a sample such as tissue cells, when the sample is larger than an imaging field of view of an imaging element, for example, partial images of the sample are sequentially acquired while a stage on which the sample is placed is being moved relative to the objective lens, and then, the partial images are combined so as to acquire an image of the entire sample.

Conventionally, in such an image acquisition device, for example, an image acquisition method called a tile scan scheme is used. In the tile scan scheme, a stage is moved so that a predetermined region of the sample is included in the field of view of the objective lens, and then, the partial images are acquired using a two-dimensional imaging element such as a region sensor in a state in which the stage is caused to stop. Then, the same operation is repeatedly executed so as to acquire a still image of the entire sample.

However, in the tile scan method, since partial images are acquired while repeatedly moving and stopping the stage, a long time taken to acquire the partial images over the entire sample is problematic. Accordingly, for example, in Patent Literatures 1 to 3, an image acquisition method of acquiring partial images using a two-dimensional imaging element without stopping a stage has been proposed. More specifically, in the image acquisition method described in Patent Literature 1, the stage is moved, and a sample is intermittently irradiated with light in synchronization with the movement of the stage, and on the other hand, partial images are continuously acquired using a two-dimensional imaging element.

CITATION LIST

Patent Literature

[Patent Literature 1] Japanese Unexamined Patent Publication No. 2003-222801
[Patent Literature 2] Japanese Unexamined Patent Publication No. 2000-501844
[Patent Literature 3] Japanese Unexamined Patent Publication No. S63-191063

SUMMARY OF INVENTION

Technical Problem

However, for example, in the image acquisition method described in Patent Literature 1, since the imaging element continues to acquire partial images during a period of time in which the sample is not irradiated with light, a large number of unnecessary images are included among the obtained partial images. Since it is necessary for the unnecessary images to be excluded when still images of the entire sample are combined, time required for combination of all images may increase due to a large number of unnecessary images being included.

The present invention has been made to solve the above problem, and an object thereof is to provide an image acquisition device and an image acquisition method for an image acquisition device capable of executing acquisition of partial images and combination of all images at high speed.

Solution to Problem

In order to solve the above problem, an image acquisition device according to the present invention includes a stage on which a sample is placed; a light emitting means for emitting instantaneous light; a light guiding optical system including an objective lens arranged to face the sample on the stage; an imaging element for capturing an optical image of the sample guided by the light guiding optical system; a driving unit for moving a position of a field of view of the objective lens relative to the sample at a predetermined velocity; and a control unit for controlling the light emitting means, wherein the imaging element is a two-dimensional imaging element including a plurality of pixel rows and for sequentially capturing at a predetermined frame rate, and the velocity is a velocity set based on at least the frame rate.

In this image acquisition device, the driving unit moves the position of the field of view of the objective lens relative to the sample at a predetermined velocity, and a two-dimensional imaging element sequentially captures an optical image of the sample at a predetermined frame rate. Therefore, time required for acquiring the partial images over the entire sample is shortened. Further, in the image acquisition device, the moving velocity of the position of the field of view is a velocity set based on the frame rate of the imaging element. Therefore, the movement of the position of the field of view and the imaging of the imaging element are synchronized with each other, and it is possible to capture only necessary partial images. Therefore, in this image acquisition device, the acquisition of the partial images and the combination of all the images can be executed at high speed.

It is preferable for the predetermined velocity to be a velocity set based on at least the number of pixel rows of the imaging element. In this case, since a moving velocity of the position of the field of view is set in consideration of a relationship between the number of pixel rows of the imaging element and a region of the sample imaged through onetime imaging, it is possible to capture only necessary partial images more reliably.

It is preferable for the predetermined velocity to be a velocity set based on at least the optical magnification of the light guiding optical system. In this case, since the moving velocity of the position of the field of view of the objective lens is set in consideration of a size of the field of view of the objective lens, it is possible to perform imaging at a desired position more reliably.

It is preferable for the predetermined velocity to be a velocity set based on at least a pixel width of the pixel row of the imaging element. In this case, since the moving velocity of the position of the field of view of the objective lens is set in consideration of a size of the field of view of the objective lens, it is possible to perform imaging at a desired position more reliably.

It is preferable for the predetermined velocity to be a velocity set so that portions of two regions of the sample to be continuously captured by the imaging element overlap each other. In this case, since the portions of two regions of the sample to be continuously captured overlap each other, the obtained partial images can be smoothly combined when the partial images are combined, and an entire continuous image can be acquired.

It is preferable for the predetermined velocity to be a velocity set based on the number of pixel rows of the imaging element corresponding to an overlapping region in which portions of the two regions overlap each other. In this case, since the moving velocity of the position of the field of view is set in consideration of a relationship between the overlapping region and the number of pixel rows of the imaging element corresponding to the overlapping region, the overlapping region is formed more reliably.

It is preferable that the imaging element outputs a trigger signal indicating that all of the pixel rows are exposed, to the control unit, and the control unit causes the instantaneous light to be emitted from the light emitting means during a period of time in which all of the pixel rows are exposed, based on the trigger signal output from the imaging element. In this case, since the instantaneous light can be emitted during a period of time in which all of the pixel rows are reliably exposed, it is possible to reliably acquire each partial image.

An image acquisition method for an image acquisition device according to the present invention is an image acquisition method for an image acquisition device including a stage on which a sample is placed, a light emitting means for emitting instantaneous light, a light guiding optical system including an objective lens arranged to face the sample on the stage, an imaging element for capturing an optical image of the sample guided by the light guiding optical system, a driving unit for moving a position of a field of view of the objective lens relative to the sample at a predetermined velocity, and a control unit for controlling the light emitting means, the image acquisition method comprising: using, as the imaging element, a two-dimensional imaging element including a plurality of pixel rows and for sequentially capturing at a predetermined frame rate, and the velocity is set based on at least the frame rate.

In this image acquisition method for an image acquisition device, the driving unit moves the position of the field of view of the objective lens relative to the sample at a predetermined velocity, and a two-dimensional imaging element sequentially captures an optical image of the sample at a predetermined frame rate. Therefore, time required for acquiring the partial images over the entire sample is shortened. Further, in the image acquisition method for an image acquisition device, the moving velocity of the position of the field of view is set based on the frame rate of the imaging element. Therefore, the movement of the position of the field of view and the imaging of the imaging element are synchronized with each other, and it is possible to capture only necessary partial images. Therefore, in this image acquisition method for an image acquisition device, the acquisition of the partial images and the combination of all the images can be executed at high speed.

It is preferable for the predetermined velocity to be set based on at least the number of pixel rows of the imaging element. In this case, since a moving velocity of the position of the field of view is set in consideration of a relationship between the number of pixel rows of the imaging element and a region of the sample imaged through onetime imaging, it is possible to capture only necessary partial images more reliably.

It is preferable for the velocity to be set so that portions of two regions of the sample to be continuously captured by the imaging element overlap each other. In this case, since the portions of two regions of the sample to be continuously captured overlap each other, the obtained partial images can be smoothly combined when the partial images are combined, and an entire continuous image can be acquired.

Advantageous Effects of Invention

According to the present invention, the acquisition of the partial images and the combination of all the images can be executed at high speed.

DESCRIPTION OF EMBODIMENTS

Hereinafter, preferred embodiments of an image acquisition device according to the present invention will be described in detail with reference to the accompanying drawings.

Figure 1:
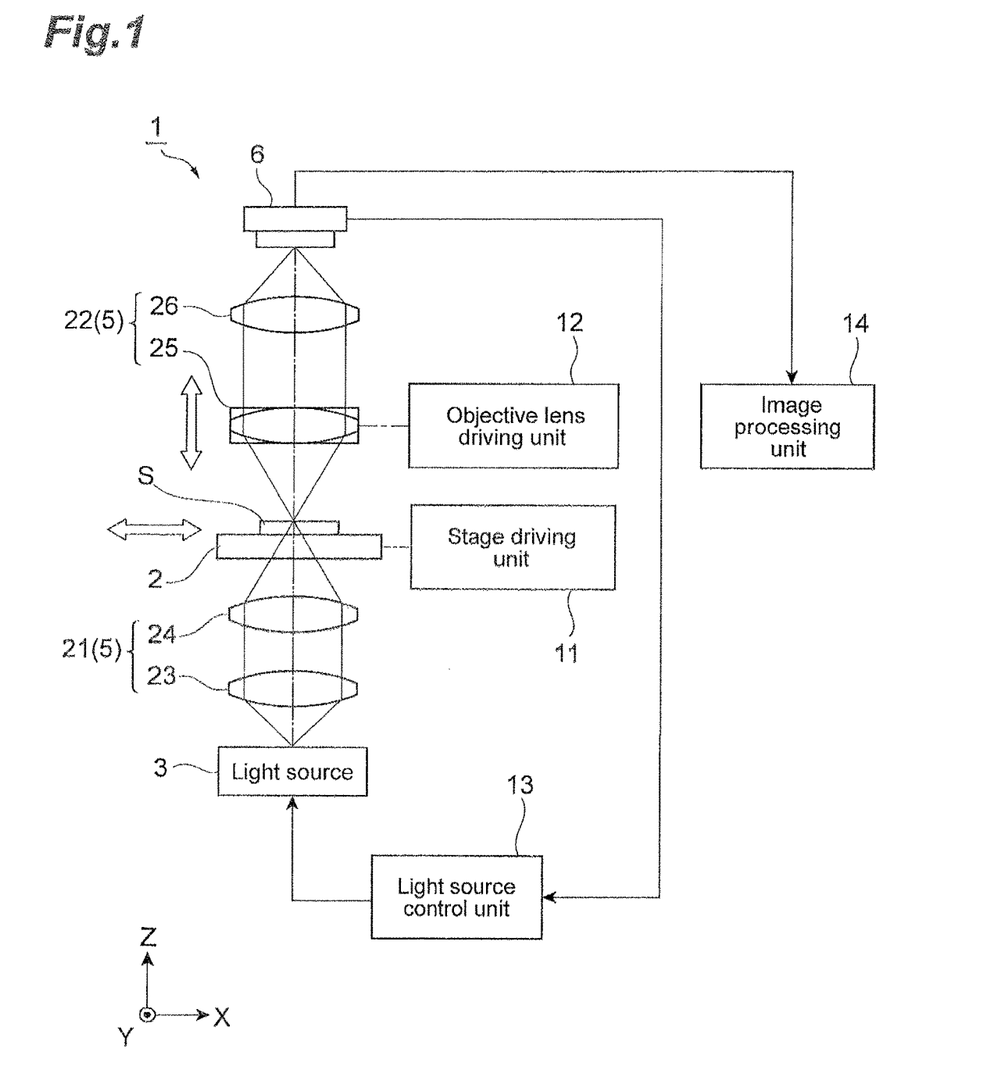
FIG. 1 is a diagram illustrating an embodiment of an image acquisition device according to the present invention.

FIG. 1 is a diagram illustrating an embodiment of an image acquisition device according to the present invention. As illustrated in FIG. 1, an image acquisition device 1 includes a stage 2 on which a sample S is placed, a light source 3 (light emitting means) that irradiates the sample with instantaneous light, a light guiding optical system 5 including an objective lens 25 arranged to face the sample S on the stage 2, and an imaging element 6 that captures an optical image of the sample S guided by the light guiding optical system 5.

Further, the image acquisition device 1 includes a stage driving unit 11 (driving unit) that moves a position of a field of view of the objective lens 25 relative to the sample S, an objective lens driving unit 12 that changes a focal position of the objective lens 25 relative to the sample S, a light source control unit 13 (control unit) that controls the light source 3, and an image processing unit 14.

The sample S observed by the image acquisition device 1 is, for example, a biological sample, such as tissue cells, and is placed on the stage 2 in a state in which the sample S is sealed on a glass slide. The light source 3 is arranged on the bottom side of the stage 2. For example, a laser diode (LD), a light emitting diode (LED), a super luminescent diode (SLD), a flash lamp light source such as a xenon flash lamp, or the like is used as the light source 3.

The light guiding optical system 5 includes an illumination optical system 21 arranged between the light source 3 and the stage 2, and a microscope optical system 22 arranged between the stage 2 and the imaging element 6. The illumination optical system 21 includes, for example, a Koehler illumination optical system including a condenser lens 23 and a projection lens 24, and guides light from the light source 3 and irradiates the sample S with uniform light.

Meanwhile, the microscope optical system 22 includes the objective lens 25, and an image forming lens 26 arranged on the downstream side (imaging element 6 side) of the objective lens 25, and guides an optical image of the sample S to the imaging element 6. The optical image of the sample S is an image formed by transmitted light in the case of bright field illumination, scattered light in the case of dark field illumination, or emitted light (fluorescence) in the case of emitted light measurement. Further, the optical image of the sample S may also be an image formed by reflected light from the sample S. In these cases, an optical system corresponding to image acquisition of the transmitted light image, the scattered light image, and the emitted light (fluorescence) image of the sample S can be adopted as the light guiding optical system 5.

Figure 2:
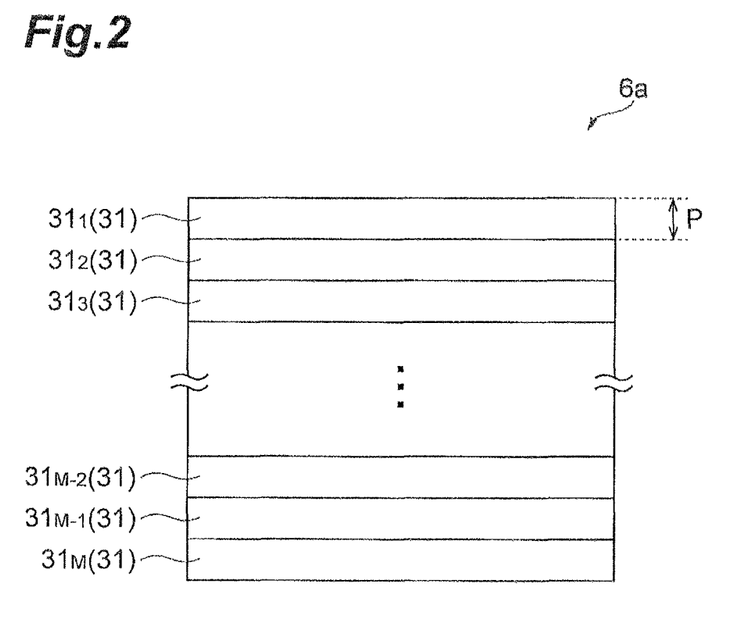
FIG. 2 is a diagram illustrating a light reception surface of an imaging element constituting the image acquisition device illustrated in FIG. 1.

The imaging element 6 is a two-dimensional imaging element having a plurality of pixel rows. Examples of such an imaging element 6 may include a CCD image sensor or a CMOS image sensor. On a light reception surface 6a of the imaging element 6, for example, M pixel rows 31 (a first pixel row $31_1$, a second pixel row $31_2$, a third pixel row $31_3$, ..., a (M−2)-th pixel row $31_{M-2}$, a (M−1)-th pixel row $34_{M-1}$, and an M-th pixel row $31_M$) in which a plurality of pixels are one-dimensionally arranged are arranged in parallel, as illustrated in FIG. 2. A length (pixel width) P in an arrangement direction (reading direction) of each pixel row 31 is, for example, about 1.5 μm. The imaging element 6 sequentially captures an optical image of the sample S guided by the light guiding optical system 5 at a predetermined frame rate α (for example, less than 30 frames per second (fps)).

The stage driving unit 11 includes, for example, a motor such as a stepping motor (pulse motor) or an actuator such as a piezoelectric actuator. The stage driving unit 11 drives the stage 2 in an XY direction relative to a surface having a predetermined angle (for example, 90°) with respect to a plane perpendicular to an optical axis of the objective lens 25. Accordingly, the sample S fixed to the stage 2 is moved relative to the optical axis of the objective lens, and a position of the field of view of the objective lens 25 relative to the sample S is moved.

Figure 3:
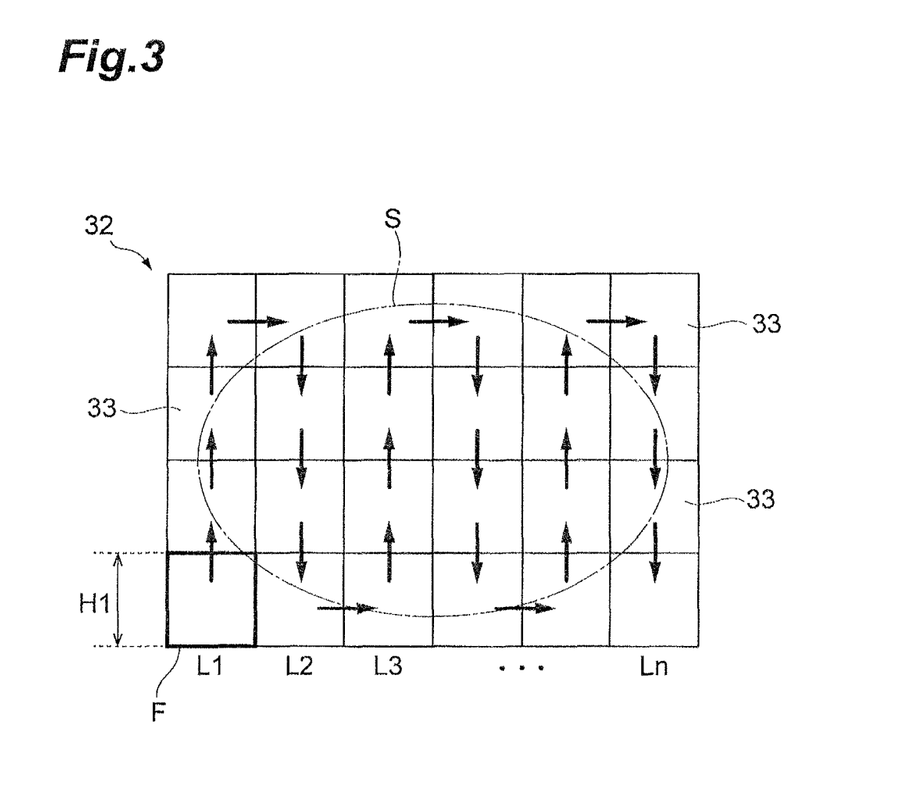
FIG. 3 is a diagram illustrating an example of scan of an image acquisition region for a sample.

In the image acquisition device 1, imaging of the sample S is performed at a high magnification such as 20× or 40×. Therefore, the field of view F of the objective lens 25 is smaller than the sample S and, as illustrated in FIG. 3, a region in which an image can be acquired by onetime imaging becomes smaller than the sample S. Accordingly, in order to image the entire sample S, it is necessary for the field of view F of the objective lens 25 to be moved relative to the sample S.

Therefore, in the image acquisition device 1, an image acquisition region 32 is set to include the sample S with respect to a sample container (for example, a glass slide) holding the sample S, and positions of a plurality of divided regions 33 are set based on the image acquisition region 32 and the field of view F of the objective lens 25 on the sample S. A portion of the sample S corresponding to a divided region 33 is imaged so as to acquire partial image data corresponding to the divided region 33, and then, if the field of view F of the objective lens 25 constitutes a position of the divided region 33 to be imaged next, imaging is performed again to acquire partial image data. Thereafter, in the image acquisition device 1, this operation is repeatedly executed, and the image processing unit 14 combines the acquired partial image data to form the entire image (combined image data) of the sample S.

In this case, the stage driving unit 11 drives the stage 2 so that a position of the field of view F of the objective lens 25 relative to the sample S is moved in a scan direction along an imaging line Ln (n is a natural number) including a plurality of divided regions 33. For the movement of the position of the field of view of the objective lens 25 relative to the sample S between adjacent imaging lines Ln, bidirectional scanning in which a scan direction is reversed between the adjacent imaging lines Ln is adopted, for example, as illustrated in FIG. 3. Further, unidirectional scanning in which the scan direction is the same direction between the adjacent imaging lines Ln may be employed. The direction along an imaging line Ln corresponds to the arrangement direction of the respective pixel rows 31 on the light reception surface 6a of the imaging element 6.

Further, the stage driving unit 11 drives the stage 2 at a velocity set based on the frame rate α of the imaging element 6. That is, the stage driving unit 11 drives the stage 2 at a velocity such that a timing at which the field of view F of the objective lens 25 constitutes the position of each divided region 33 matches a timing at which the imaging element 6 performs imaging.

Specifically, the stage driving unit 11 drives the stage 2, for example, at a velocity V shown in Equation (1) below based on the number M of pixel rows 31.

$$V = A \times M \times \alpha \quad (1)$$

Here, in Equation (1), A denotes pixel resolution (=length P in an arrangement direction of the pixel rows 31/optical magnification of the microscope optical system 22).

Further, the stage driving unit 11 may drive, for example, the stage 2 at a velocity V expressed by Equation (2) below obtained by rewriting Equation (1).

$$V = H1 \times \alpha \quad (2)$$

Here, in Equation (2), H1 denotes a length in a direction along an imaging line Ln of the field of view F of the objective lens 25.

The objective lens driving unit 12 includes, for example, a motor such as a stepping motor (pulse motor) or an actuator such as a piezoelectric actuator, similar to the stage driving unit 11. The objective lens driving unit 12 drives the objective lens 25 in a Z direction along the optical axis of the objective lens 25. Accordingly, the focal position of the objective lens 25 relative to the sample S is moved.

Figure 4:
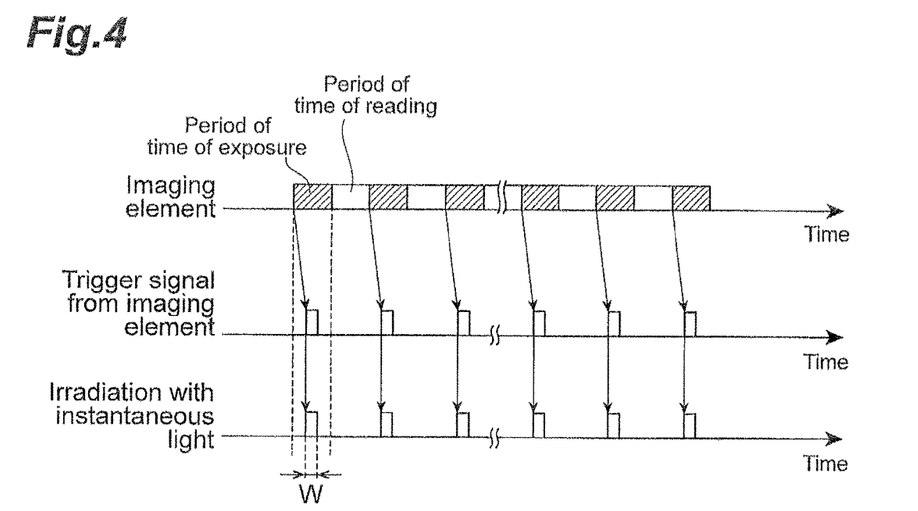
FIG. 4 is a diagram illustrating an example of a relationship between a period of time of exposure and a period of time of reading and irradiation of instantaneous light in the imaging element.

The light source control unit 13 causes the instantaneous light to be emitted from the light source 3, as illustrated in FIG. 4. That is, first, the imaging element 6 alternately performs exposure and reading, and outputs a trigger signal to the light source control unit 13 when all the pixel rows 31 (a first pixel row $31_1$, a second pixel row $31_2$, a third pixel row $31_3$, ..., an M-th pixel row $31_M$) are exposed.

Subsequently, the light source control unit 13 causes the instantaneous light to be emitted from the light source 3 based on the trigger signal indicating that all the pixel rows 31 are exposed, which is output from the imaging element 6. The instantaneous light has, for example, a pulse width W shown in Equation (3) below.

$$W = A/V \quad (3)$$

By the instantaneous light having the pulse width W expressed by Equation (3), it is easy for an optical image from a predetermined position of the sample S to be received by only one predetermined row among the pixel rows 31. Therefore, it becomes possible to obtain a still image of which the distortion is suppressed. Thereafter, in the image acquisition device 1, the above-described operation is repeatedly performed.

As described above, in the image acquisition device 1, by the stage driving unit 11 driving the stage 2, the position of the field of view F of the objective lens 25 relative to the sample S is moved, and the imaging element 6 which is a two-dimensional imaging element sequentially captures the optical image of the sample S at a predetermined frame rate α. Therefore, time for acquiring the partial images over the entire sample S is shortened. Further, in the image acquisition device 1, the stage driving unit 11 drives the stage 2 at a velocity based on the frame rate α of the imaging element 6. Therefore, driving of the stage 2 (movement of the position of the field of view F of the objective lens 25) and imaging of the imaging element 6 are synchronized with each other so that a timing at which a field of view F of the objective lens 25 constitutes the position of each divided region 33 matches a timing at which the imaging element 6 performs imaging. Accordingly, it is possible to capture only the partial image corresponding to each divided region 33. Therefore, in the image acquisition device 1, the acquisition of the partial images and the combination of all the images can be executed at high speed.

Further, the light source control unit 13 causes the instantaneous light to be emitted from the light source 3 during a period of time in which all the pixel rows 31 are exposed, based on the trigger signal indicating that all the pixel rows 31 are exposed, which is output from the imaging element 6. Therefore, the partial images can be reliably acquired in all of the divided regions 33.

The present invention is not limited to the above embodiment. For example, while the light source control unit 13 causes the instantaneous light to be emitted from the light source 3 based on the trigger signal output from the imaging element 6 in the above embodiment, the light source control unit 13 may cause the instantaneous light to be emitted from the light source 3 during the period of time in which all the pixel rows 31 are exposed, by setting a timing at which the instantaneous light is caused to emitted from the light source 3 to be synchronized with a timing at which the imaging element 6 performs imaging based on the frame rate α of the imaging element 6. In this case, the partial images can be reliably acquired in all of the divided regions 33.

Further, while the instantaneous light is emitted from the light source 3 in the above embodiment, continuous light (CW light) may be emitted from the light source 3 and a shutter may be provided between the light source 3 and the sample S. In this case, a light emitting means is configured with the light source 3 and the shutter, and the light source control unit 13 controls opening and closing of the shutter. Accordingly, the sample S can be irradiated with the instantaneous light during the period of time in which all the pixel rows 31 are exposed.

Further, while the position of the field of view of the objective lens 25 relative to the sample S is moved by the stage driving unit 11 driving the stage 2 in the above embodiment, a light guiding optical system driving unit (driving unit) that drives the light guiding optical system 5 including the objective lens 25 may be provided, and the position of the field of view of the objective lens 25 relative to the sample S may be moved by the light guiding optical system driving unit.

Further, while the focal position of the objective lens 25 relative to the sample S is moved in the optical axis direction of the objective lens 25 by the objective lens driving unit 12 moving the objective lens 25 in the optical axis direction thereof in the above embodiment, the focal position of the objective lens 25 relative to the sample S may be moved in the optical axis direction of the objective lens 25 by the stage driving unit 11 moving the stage 2 in the optical axis direction of the objective lens 25.

Further, while the stage driving unit 11 drives the stage 2 so that two divided regions 33 to be continuously captured come in contact with each other in the above embodiment, the stage driving unit 11 may drive the stage 2 so that the two divided regions 33 to be continuously captured partially overlap each other.

Figure 5:
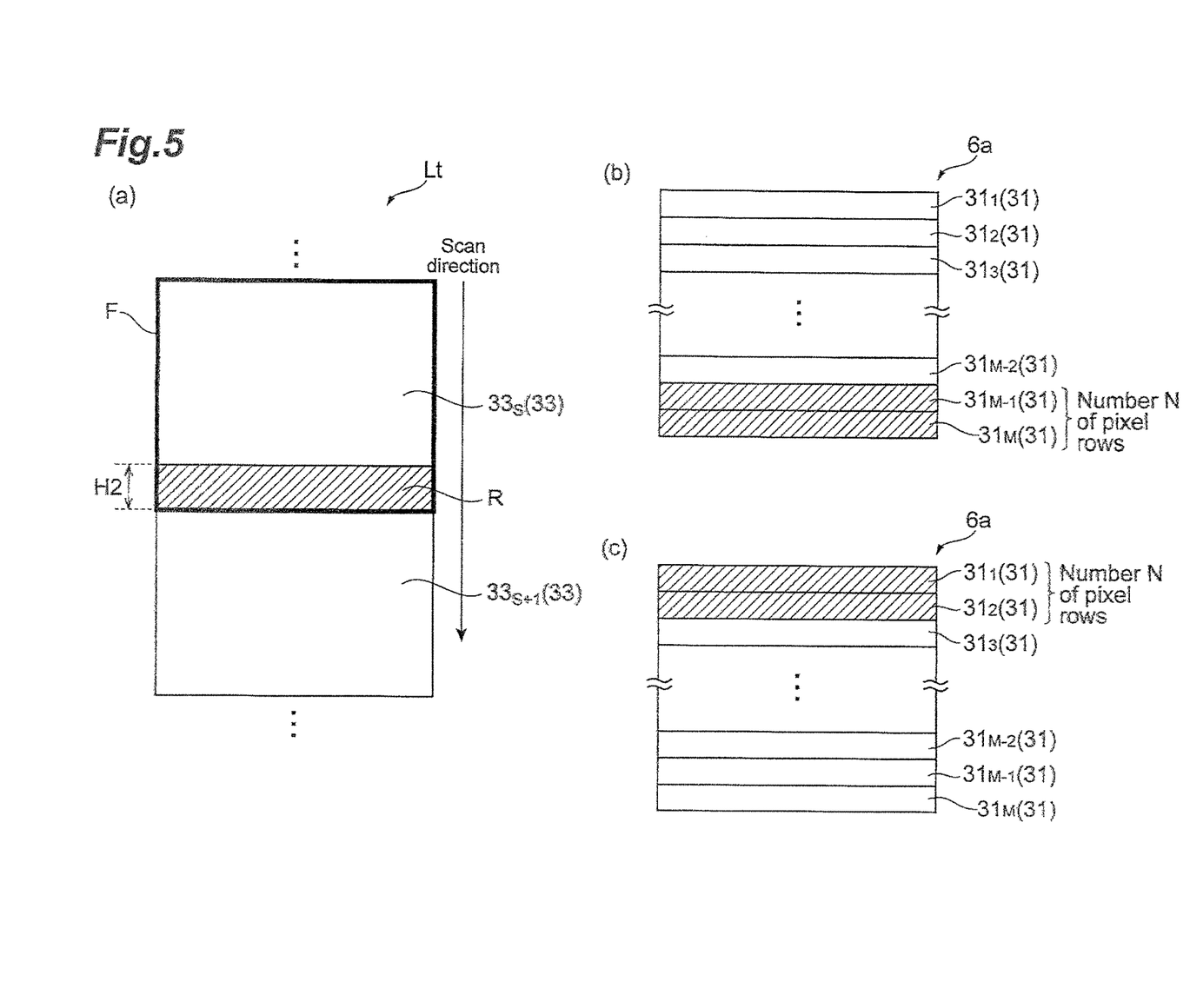
FIGS. 5(a) to 5(c) are diagrams illustrating an example of a relationship between scan of an image acquisition region and a light reception surface of the imaging element according to a modification example.

That is, as illustrated in FIG. 5(a), when a divided region $33_{S+1}$ following a divided region $33_S$ in an imaging line Lt (t is a natural number equal to or greater than 1 and smaller than or equal to n) is imaged by the imaging element 6, the stage driving unit 11 may drive the stage 2 so that an overlapping region R in which a portion of the divided region $33_S$ and a portion of the divided regions $33_{S+1}$ overlap each other is formed.

Specifically, the stage driving unit 11 can drive the stage 2 at a velocity V' shown in Equation (4) below, for example, based on the number N of pixel rows on the light reception surface 6a of the imaging element 6 corresponding to the overlapping region R.

$$V'=A\times(M-N)\times\alpha \qquad (4)$$

In this case, when the field of view F of the objective lens 25 constitutes a position of the divided region $33_S$, for example, an (M−1)-th pixel row $31_{M-1}$ and an M-th pixel row $31_M$ on the light reception surface 6a of the imaging element 6 correspond to the overlapping region R, as illustrated in FIG. 5(b). On the other hand, when the field of view F of the objective lens 25 constitutes a position of the divided region $33_{S+1}$, for example, a first pixel row $31_1$ and a second pixel row $31_2$ on the light reception surface 6a of the imaging element 6 correspond to the overlapping region R, as illustrated in FIG. 5(c).

As described above, the stage driving unit 11 drives the stage 2 at a velocity V' shown in Equation (4) based on the number N of pixel rows (N=2 in the example illustrated in FIGS. 5(a) to 5(c)) on the light reception surface 6a of the imaging element 6 corresponding to the overlapping region R. In this case, the stage driving unit 11 may drive the stage 2, for example, at a velocity V' shown in Equation (5) below obtained by rewriting Equation (4).

$$V'=(H1-H2)\times\alpha \qquad (5)$$

Here, in Equation (5), H2 denotes a length of the overlapping region R in a direction along an imaging line Lt.

In this case, since the driving velocity of the stage 2 is set in consideration of the relationship between the overlapping region R and the number N of pixel rows on the light reception surface 6a of the imaging element 6 corresponding to the overlapping region R, the overlapping region R is reliably formed. Accordingly, when the obtained partial images are combined, the partial images can be smoothly combined and an entire continuous image can be acquired.

REFERENCE SIGNS LIST

1: image acquisition device, 2: stage, 3: light source (light emitting means), 5: light guiding optical system, 6: imaging element, 11: stage driving unit (driving unit), 12: objective lens driving unit, 13: light source control unit (control unit), 14: image processing unit, 22: microscope optical system, 25: objective lens, 31: pixel row, 32: image acquisition region, 33: divided region, F: field of view of objective lens, R: overlapping region, S: sample.

The invention claimed is:
1. An image acquisition device, comprising:
a stage on which a sample is placed;
a light source configured to emit instantaneous light;
a light guiding optical system including an objective lens arranged to face the sample on the stage;

an imaging sensor configured to capture an optical image of the sample guided by the light guiding optical system;
a driver configured to move a position of a field of view of the objective lens relative to the sample at a predetermined velocity; and
a controller configured to control the light source,
wherein the imaging sensor is a two-dimensional imaging sensor including a plurality of pixel rows and for sequentially capturing at a predetermined frame rate, and
the velocity is a velocity set by the following formula:

$$V'=A\times(M-N)\times\alpha,$$

where A denotes pixel resolution, M denotes the number of pixel rows of the imaging sensor, N denotes the number of pixel rows of the imaging sensor corresponding to an overlapping region in which portions of two regions of the sample to be continuously captured by the imaging sensor overlap each other, and α denotes the frame rate.

2. The image acquisition device according to claim 1, wherein the velocity is a velocity set based on at least optical magnification of the light guiding optical system.

3. The image acquisition device according to claim 1, wherein the velocity is a velocity set based on at least a pixel width of the pixel row of the imaging element.

4. The image acquisition device according to claim 1, wherein the imaging sensor outputs a trigger signal indicating that all of the pixel rows are exposed, to the controller, and
the controller causes the instantaneous light to be emitted from the light source during a period of time in which all of the pixel rows are exposed, based on the trigger signal output from the imaging sensor.

5. An image acquisition method, comprising: emitting instantaneous light by a light source,
sequentially capturing an optical image of a sample guided by a light guiding optical system including an objective lens at a predetermined frame rate by a two-dimensional imaging sensor including a plurality of pixel rows,
moving a position of a field of view of the objective lens relative to the sample at a predetermined velocity, and
controlling at which the instantaneous light is caused to emitted from the light source, wherein the velocity is set by the following formula:

$$V'=A\times(M-N)\times a,$$

where A denotes pixel resolution, M denotes the number of pixel rows of the imaging sensor, N denotes the number of pixel rows of the imagine sensor corresponding to an overlapping region in which portions of two regions of the sample to be continuously captured by the imaging sensor overlap each other, and a denotes the frame rate.

* * * * *